(12) United States Patent
Rio et al.

(10) Patent No.: US 6,685,461 B2
(45) Date of Patent: Feb. 3, 2004

(54) THREE-TUBE BURNER FOR FURNACES, ESPECIALLY GLASS AND METALLURGICAL FURNACES, AND METHOD OF INJECTING FUEL AND OXIDIZER BY MEANS OF SUCH A BURNER

(75) Inventors: Laurent Rio, Versailles (FR); Thierry Legiret, Toussus le Noble (FR); Jean-Christophe Fave, Paris (FR)

(73) Assignee: L'Air Liquide Societe Anonyme à Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 15 days.

(21) Appl. No.: 09/968,781

(22) Filed: Oct. 3, 2001

(65) Prior Publication Data

US 2002/0039711 A1 Apr. 4, 2002

(30) Foreign Application Priority Data

Oct. 3, 2000 (FR) .............................. 00 12599

(51) Int. Cl.[7] .............................. F23M 3/02; F23M 3/04
(52) U.S. Cl. .............................. 431/8; 431/10; 431/12; 431/353
(58) Field of Search .............................. 431/8, 9, 10, 12, 431/181, 186, 187, 188, 190, 353, 354

(56) References Cited

U.S. PATENT DOCUMENTS

| 2,458,543 | A |  | 1/1949 | Urquhart |
| 3,209,811 | A |  | 10/1965 | Strang |
| 4,095,929 | A |  | 6/1978 | McCartney |
| 4,626,195 | A |  | 12/1986 | Sato et al. |
| 4,931,013 | A |  | 6/1990 | Brahmbhatt et al. |
| 4,933,163 | A | * | 6/1990 | Fischer et al. ............ 423/574.1 |
| 5,743,723 | A | * | 4/1998 | Iatrides et al. .................. 431/8 |
| 6,142,765 | A | * | 11/2000 | Ramaseder et al. ............ 431/9 |
| 6,190,158 | B1 | * | 2/2001 | Legiret et al. .................. 431/8 |
| 6,206,687 | B1 | * | 3/2001 | Redington .................... 431/90 |

FOREIGN PATENT DOCUMENTS

| DE | 1 060 082 | 10/1953 |
| EP | 0 850 883 A2 | 12/1997 |

OTHER PUBLICATIONS

Search Report issued in Application No. FR 00 12599.

* cited by examiner

*Primary Examiner*—Alfred Basichas
(74) *Attorney, Agent, or Firm*—Burns, Doane, Swecker & Mathis, L.L.P.

(57) ABSTRACT

To reduce the overall size of and to simplify the supply for three-tube burners, and to allow easier interchangeability with two-tube burners, the burner (Br) comprises an inlet (5) for a fuel and a fuel feed tube (2) connected to this fuel inlet, an inlet (6) for an oxidizer and two oxidizer feed tubes (1, 3) connected to this oxidizer inlet, and a control valve (7, 9) for controlling the distribution of the oxidizer between the two oxidizer feed tubes (1, 3). By means of this burner, and more specifically of the control valve (7, 9), the distribution of the oxidizer between the two oxidizer feed tubes (1, 3) may be continuously adjusted.

37 Claims, 4 Drawing Sheets

THREE-TUBE BURNER FOR FURNACES, ESPECIALLY GLASS AND METALLURGICAL FURNACES, AND METHOD OF INJECTING FUEL AND OXIDIZER BY MEANS OF SUCH A BURNER

BACKGROUND OF THE INVENTION

1. Field of the Invention

The invention relates to three-tube burners designed to produce a flame from a central injection and an annular peripheral injection of oxidizer and from an annular injection of fuel between the central injection and the annular peripheral injection of oxidizer, as well as to a method of injecting fuel and oxidizer by means of such a burner.

2. Description of the Related Art

Three-tube burners are used especially in glass furnaces, and can also be used in metallurgical furnaces, instead of two-tube burners for the purpose of being able to control the atmosphere in the furnace, to increase the momentum of the flame, to adjust the length of the latter according to the geometry of the furnace (for example in the case of narrow furnaces) and to modify its luminosity and, especially, its emission spectrum according to the type of material to be produced in the furnace, for example of the glass type.

At the present time, most oxygen burners used in glass furnaces are two-tube burners, the body of which is fitted with oxidizer supply devices and with fuel supply devices.

Replacing two-tube burners with three-tube burners for the purpose of achieving the abovementioned advantages is problematic since it then becomes necessary to manage three fluid streams, thereby increasing the overall size, and the number of supply ducts, and this means significant modifications have to be made to the plant intended to supply the burner with fluids.

SUMMARY OF THE INVENTION

The object of the invention is to remedy these drawbacks and for this purpose relates to a three-tube burner for a furnace, designed to be fastened to a furnace quarl in such a way that at least one end region of the burner is housed in the quarl in order to produce therein a flame projecting into the internal space of the furnace, the said burner being characterized in that it comprises an inlet for a fuel and a fuel feed tube connected to this fuel inlet, an inlet for an oxidizer and two oxidizer feed tubes connected to this oxidizer inlet, and a control valve for controlling the distribution of the oxidizer between the two oxidizer feed tubes.

By virtue of this arrangement, when replacing a two-tube burner with a three-tube burner the fluid supply plant can be reused as it is, without modification, and it is furthermore possible for the distribution of oxidizer between the two oxidizer feed tubes to be accurately adjusted.

The burner may also have one or more of the following characteristics:
- one oxidizer feed tube and the fuel feed tube are housed in another oxidizer feed tube;
- the feed tubes are arranged coaxially around one another, at least over part of their length;
- the control valve is housed in the burner, by being inserted into an oxidizer feed tube;
- the control valve is a plug valve;
- it includes an oxidizer feed tube having an oxidizer inlet end open inside another oxidizer feed tube;
- it comprises, coaxially arranged over at least part of their length, a central oxidizer feed tube, a fuel feed tube defining an annular space for flow of fuel around the central tube, an outer oxidizer feed tube defining an annular space for flow of oxidizer around the fuel feed tube, and an annular bush inserted into the annular space for flow of oxidizer between the fuel feed tube and the outer oxidizer feed tube, downstream of an open end of the central tube in the outer tube and also downstream of the inlet duct for the oxidizer, this bush having, on the one hand, a channel allowing the oxidizer to flow towards the quarl and, on the other hand, a movable member cooperating with the channel to form a control valve;
- the bush has a channel in which a plug is housed, the said plug having a calibrated hole allowing the oxidizer to flow towards the quarl with a predetermined minimum flow rate;
- the bush has a channel forming a valve plug in which a pivoting valve key is housed, the said key having a through-hole and able to move from a position in which the through-hole allows the oxidizer to flow with the maximum flow rate through the valve and thus with the minimum flow rate through the central tube to a position in which the through-hole prevents any flow of oxidizer through the valve and thus causes flow with the maximum flow rate through the central tube;
- the valve includes an operating member allowing it to pivot manually;
- the valve includes a driving member designed to be connected to a motor-drive device.

The invention also relates to a method of injecting fuel and oxidizer into a furnace quarl by means of a burner for producing a flame projecting into the internal space of the furnace, characterized in that an oxidizer is introduced into the burner via a first inlet and a fuel is introduced via a second inlet, the fuel coming from the first inlet flows towards the quarl through at least two oxidizer feed tubes mounted in parallel one with respect to the other, while the fuel coming from the second inlet flows towards the quarl through another fuel feed tube.

The process may furthermore have the following characteristics:
- the distribution of the oxidizer between the oxidizing feed tubes is continuously adjusted;
- the distribution of the oxidizer between the oxidizer feed tubes is adjusted manually;
- the distribution of the oxidizer between the oxidizer feed tubes is adjusted in a motor-driven manner;
- the distribution of the oxidizer between the oxidizer feed tubes is regulated or controlled; and
- the fuel flows towards and is injected into the quarl in an annular manner around a first, central, stream of oxidizer and within a second, annular, stream of the same oxidizer.

BRIEF DESCRIPTION OF THE FIGURES OF THE DRAWING

Further features and advantages of the invention will become apparent from the description which follows of one embodiment of this invention given by way of non-limiting example and illustrated by the appended drawings in which.

DETAILED DESCRIPTION OF THE PREFERRED EMBODIMENTS

The figures show schematically a burner Br, one end region of which is housed in a quarl of a quarl block Bo of a glass furnace for example.

Figure 1:
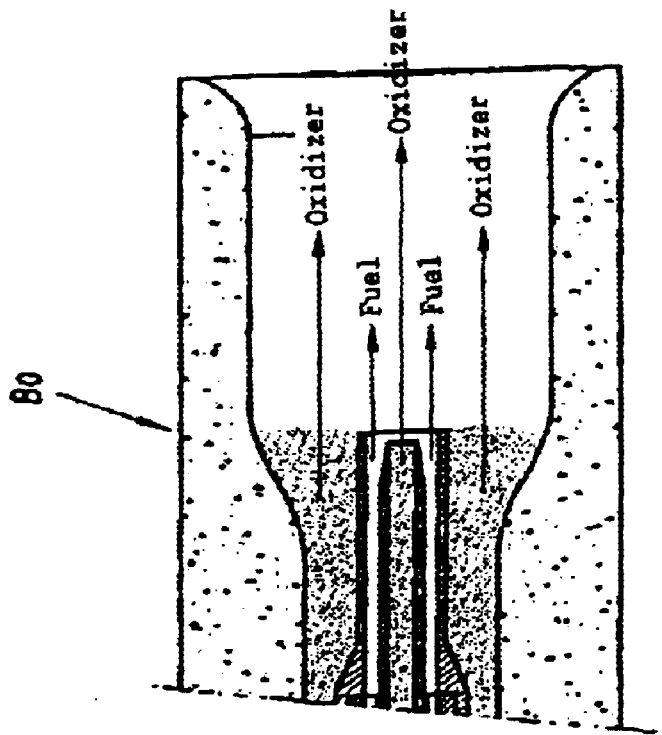
FIG. 1 is a schematic longitudinal sectional side view of a conventional three-tube burner.
Figure 1:
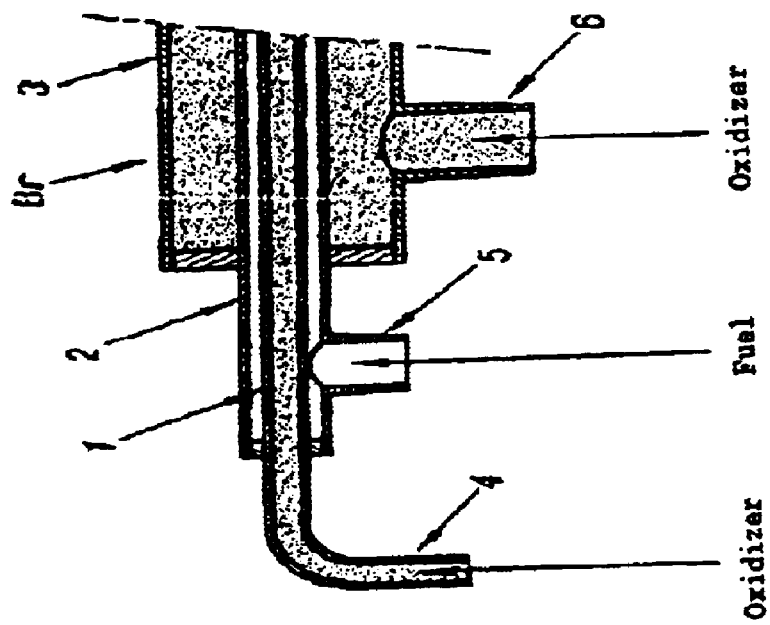

More specifically, FIG. 1 shows schematically the end region of a conventional three-tube burner housed in the quarl, in order to produce therein a flame projecting into the internal space of the furnace, and the opposite end region of the burner, which projects out of the quarl on the outside of the furnace and via which the burner is supplied with fuel and with oxidizer.

This three-tube burner has a coaxial overall structure and comprises a central oxidizer feed tube 1, a fuel feed tube 2 surrounding the central tube, the space in which feed tube 2, for flow of the fuel, lying annularly around this central tube, and a third, outer, oxidizer feed tube 3 surrounding the fuel feed tube 2, the space in which feed tube 3, for flow of the oxidizer, lying annularly around this fuel feed tube. The ends of the three tubes running into the quarl are each extended by an injection nozzle.

In the conventional three-tube burner there is no communication between the three tubes 1, 2, 3, these being supplied separately, each having an inlet orifice and being fitted with a short inlet duct 4, 5, 6 running into this orifice and connected either to an oxidizer supply, for the central tube 1 and the outer tube 3, or to a fuel supply, for the intermediate tube 2; each of the inlet ducts 4, 5, 6 lies approximately radially with respect to the central longitudinal axis of the burner around which the three tubes lie.

It is therefore necessary to manage three fluids, the burner is relatively bulky, it is necessary to use three flexible supply pipes and the lengths of the piping to be used are significant.

Figure 2:
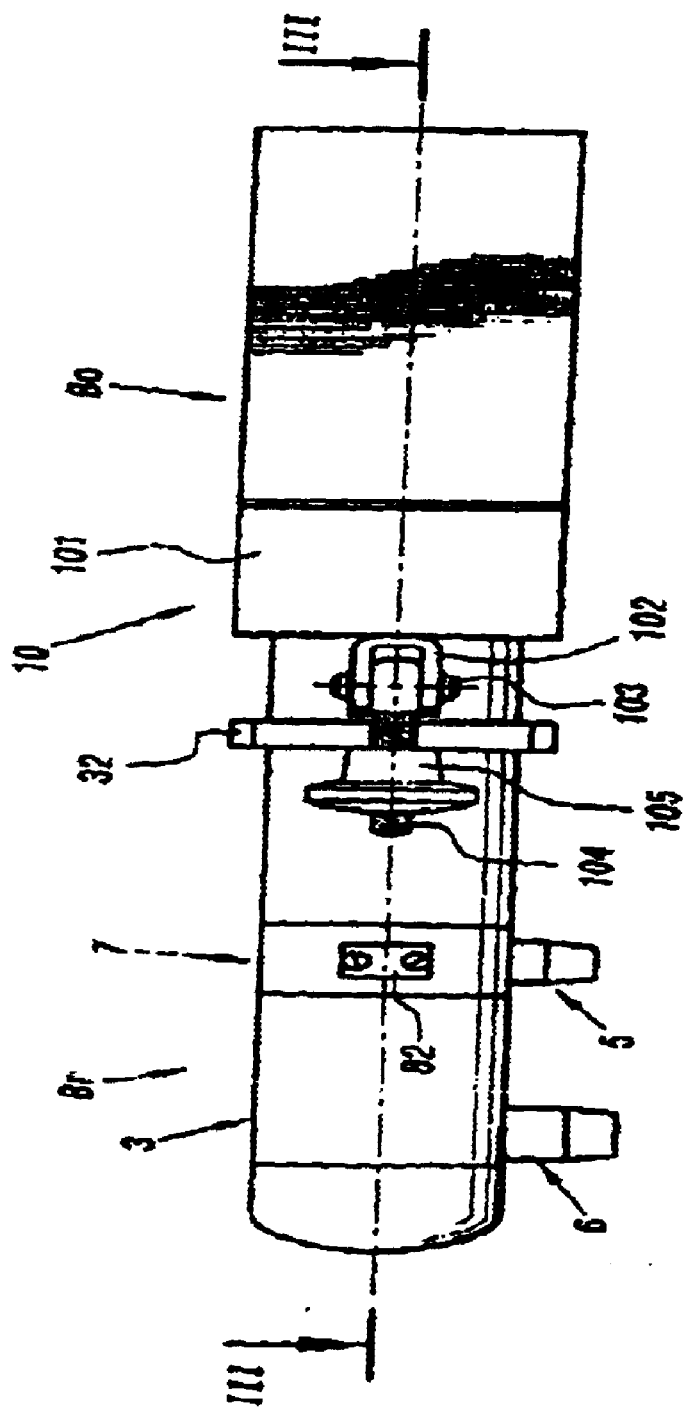
FIG. 2 is an external side view of a three-tube burner according to the invention.
Figure 3:
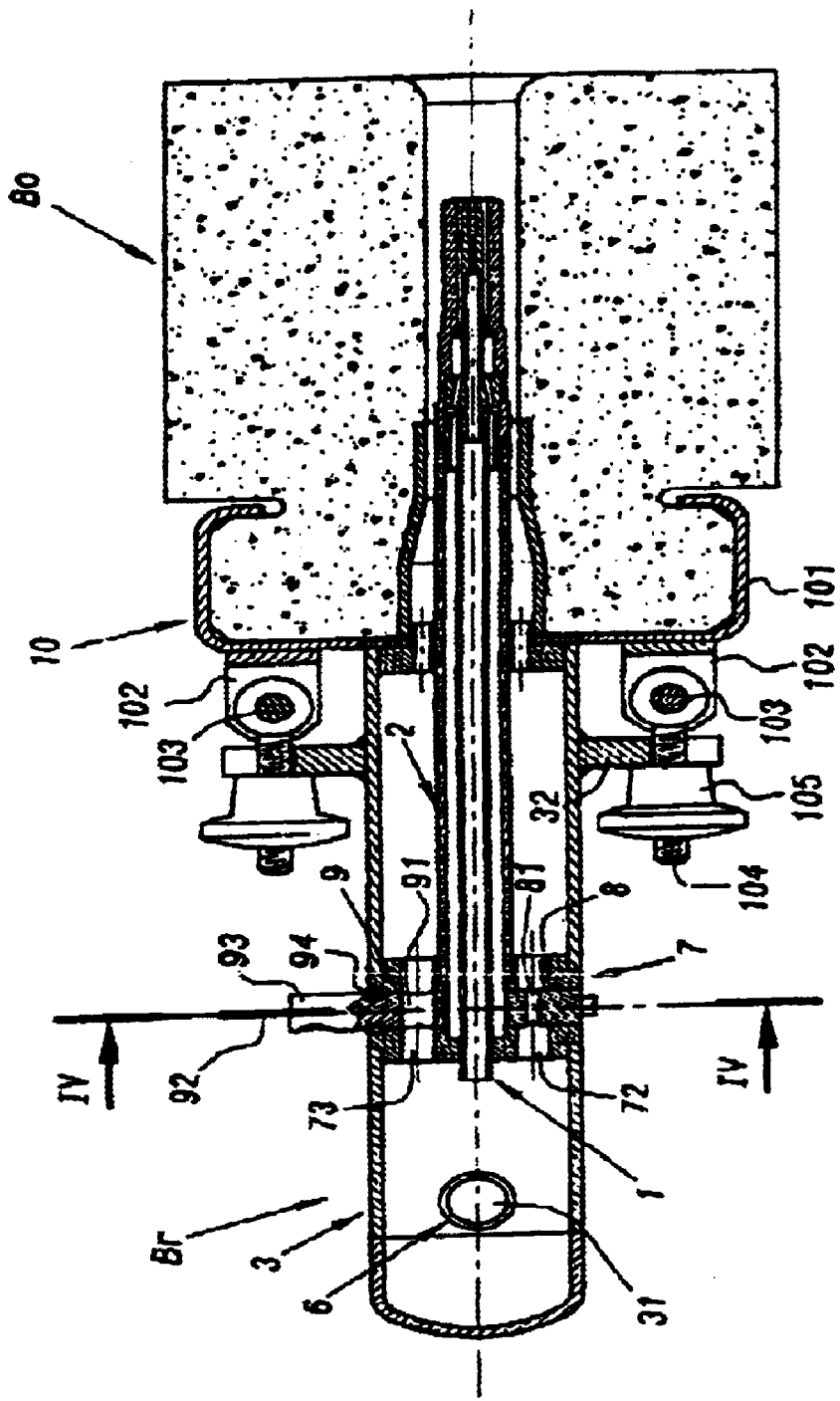
FIG. 3 is a schematic sectional view of a three-tube burner of FIG. 2 in a plane III—III perpendicular to the plane of projection of this FIG. 2.
Figure 4:
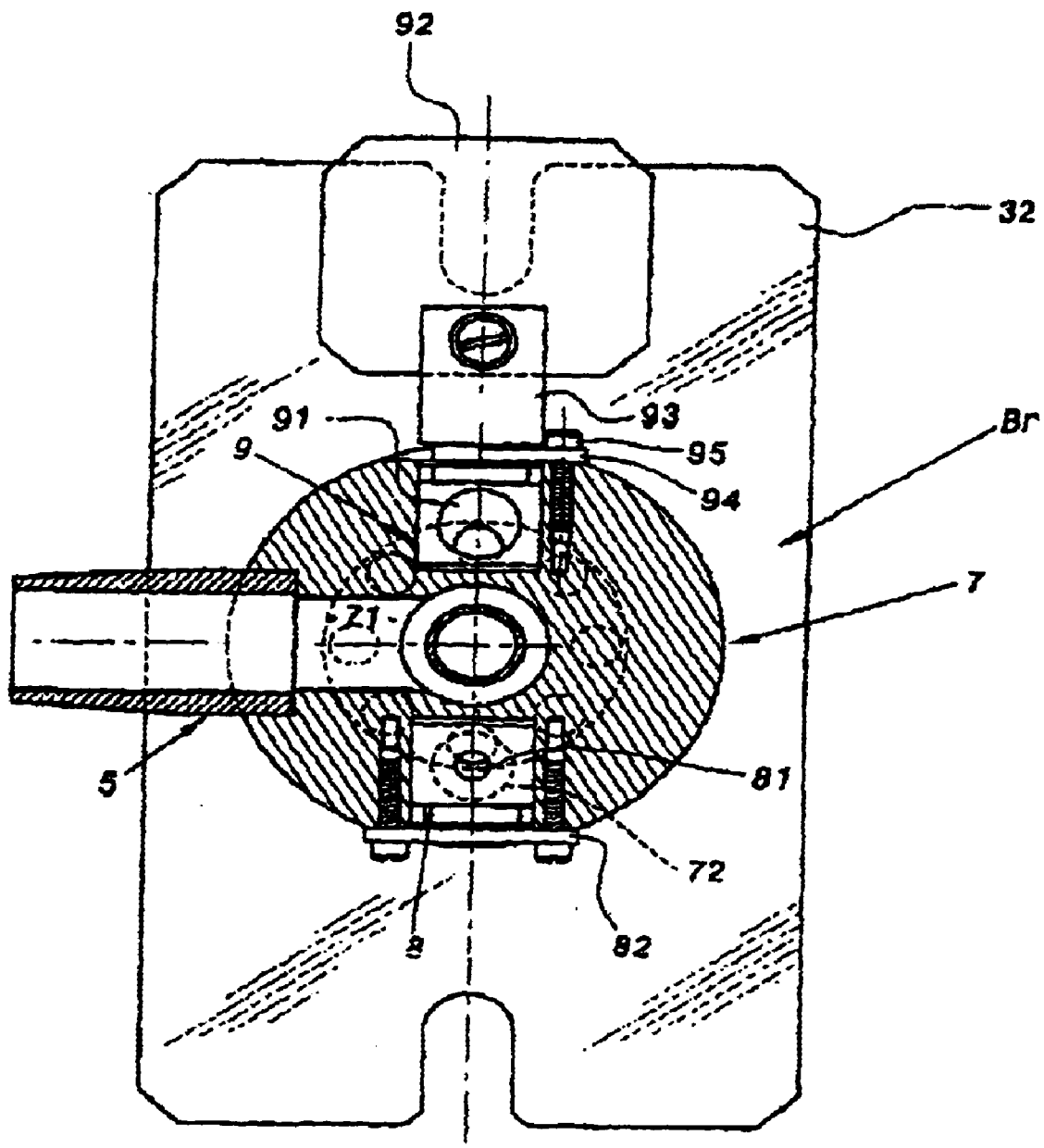
FIG. 4 is a schematic sectional view of the burner of FIGS. 2 and 3 in a plane IV—IV perpendicular to its longitudinal central axis.

The three-tube burner according to the invention (FIGS. 2 to 4) mounted in the quarl like the conventional three-tube burner has, like the latter, a coaxial overall structure and comprises a central oxidizer feed tube 1, a fuel feed tube 2 surrounding the central tube, the space in which feed tube 2, for flow of the fuel, lying annularly around the central tube, and a third, outer, oxidizer feed tube 3 surrounding the fuel feed tube 2, the space in which feed tube 3, for flow of the oxidizer, lying annularly around this fuel feed tube, the ends of the three tubes running into the quarl each being extended by an injection nozzle. Thus, the fuel flows towards and is injected into the quarl in an annular manner around a first, central, stream of oxidizer and within a second, annular, stream of the same oxidizer.

However, unlike the conventional three-tube burner, the two oxidizer feed tubes 1, 3 of the burner according to the invention communicate with each other via their end opposite the injection nozzle, the central tube 1 having this opposite end open, at some distance from the corresponding closed end of the outer tube 3.

The outer oxidizer feed tube 3 has, near this closed end, an inlet orifice 31 and is fitted with a short inlet duct 6 running into this orifice and designed to be connected to an oxidizer supply, this inlet duct 6 lying approximately radially with respect to the central longitudinal axis of the burner; thus, the inlet duct 6 for the oxidizer supply communicates both with the external tube 3 and the central tube 1, the open end of which is downstream of the duct 6 if one refers to the direction of flow of the oxidizer in the burner.

The end region of the fuel feed tube 2 opposite the injection nozzle, which itself lies downstream of the open end of the central tube 1 if one refers to the direction of flow of the oxidizer, is housed in an annular bush 7, the inner surface of which is fitted onto a downstream part of its length around the intermediate tube 2 and onto another (upstream) part of its length around the central oxidizer feed tube 1; these two parts of the inner surface of the bush are joined by a shoulder forming a closed annular bottom for the intermediate tube 2; since the outer tube 3 has two aligned sections lying on each side of the bush 7 respectively, the outer surface of the bush has a cylindrical central region inserted between these two sections and two cylindrical end regions of smaller diameter fitted and inserted into the opposing ends of these two sections of the outer tube.

The intermediate fuel feed tube 2 and the outer oxidizer feed tube 3 have opposite respective orifices for flow of fuel which are joined by a hollowed fuel feed channel 71 (FIG. 4) lying radially in the bush 7. The fuel flow orifice of the outer tube is fitted with a short inlet duct 5 designed to be connected to a fuel supply; thus, this inlet duct 5 for the fuel supply communicates through the bush 7 with the intermediate fuel feed tube 2.

Since the bush 7 is downstream of the oxidizer inlet duct 6, it is cut longitudinally with two channels 72, 73 parallel to the central longitudinal axis of the burner and intended to allow the oxidizer to flow towards the nozzle of the outer tube 3; these two longitudinal channels 72, 73 are centred on the diameter of the bush 7 which is perpendicular to the radius along which the fuel feed channel 71 lies, respectively on either side of the central longitudinal axis of the burner, approximately symmetrically.

The bush is also cut with two channels of cylindrical overall shape passing radially through it from its inner surface to its outer surface, along the diameter on which the two longitudinal channels 72, 73 are centred, so that, on each side of the bush 7 with respect to the central longitudinal axis of the burner, a longitudinal channel 72, 73 runs into a radial channel.

One of the two radial channels serves as a housing for an interchangeable plug 8 fitted into this channel, having a small-diameter hole 81 parallel to the central longitudinal axis of the burner so that there is communication between the upstream and downstream parts of the longitudinal channel 72. This hole 81 is calibrated, as will be seen below, and the interchangeability of the plugs 8 makes it possible to choose the plug having the hole of the desired size.

The other radial channel serves as a plug with a pivoting valve key 9 fitted into this channel in such a way that the bush 7 forms a valve body; this valve key 9 has a hole 91 of diameter substantially greater than that of the holes 81 in the interchangeable plugs 8 and can move so as to pivot about the longitudinal axis of the radial channel between a position in which the hole 91 is parallel to the central longitudinal axis of the burner (FIG. 3), so as to provide communication between the upstream and downstream parts of the longitudinal channel 72 and thus between the two sections of the outer tube 3, and a position in which the hole 91 is orthogonal to this axis of the burner and does not provide such a communication. The key 9 has, in the radial channel, an axisymmetric outer shape and outside the channel, externally to the outer tube of the burner, has an operating member 92 allowing it to pivot manually, or a driving member connected to a motor-drive device, allowing it to pivot in a motor-driven, for example regulated or controlled, manner.

From the practical standpoint, the interchangeable plug 8 may also have, internally to the radial channel, a cylindrical overall shape and include, outside the channel, a clamping plate 82 for fastening to the bush by screws.

The valve key 9 may also have, internally to the radial channel, a cylindrical overall shape and include, outside the channel, a stem 93 to which the operating member consisting of a lug 92 is fastened by a screw, the cylinder internal to the radial channel and the stem 93 being connected by an annular groove serving as a housing for the lateral branches of a U-shaped stop plate 94 fastened to the bush 7 by one or more fastening screws 95 of the key, screwed into the bush 7 around the radial channel and lying parallel to the latter.

In order to fasten the burner Br into the quarl cut into a refractory block Bo incorporated into the wall of the furnace, this quarl block Bo is fitted with a burner support 10 having an anchoring plate 101 which is fastened to it and is applied against its face external to the furnace. The anchoring plate 101 has, opposite the orifice of the quarl running to the outside of the furnace, an opening via which the burner is inserted into the quarl so that, as has been seen, its end region provided with injection nozzles produces a flame projecting into the internal space of the furnace, and its opposite end region via which it is fitted so as to be supplied with fuel and with oxidizer projects out of the quarl externally to the furnace. The burner support 10 is provided, respectively on either side of the opening for the burner in the anchoring plate 101, with two fastening devices, each comprising a yoke 102, the branches of which have a pivot 103 to which a threaded rod 104 having a locknut 105 is articulated.

In order to cooperate with these fastening devices, the burner has a fastening flange 32 lying in a plane perpendicular to its central longitudinal axis and fastened, for example welded or brazed, to the outer tube 3. Two opposite edges of this flange 32 have, respectively, two recesses into which the two articulated threaded rods 104 of the support 100 enter when they lie parallel to the central longitudinal axis of the burner, and against the perimeter of which the locknuts 105 can be immobilized in order to fasten the burner to the quarl block; in order to be able to remove the burner from the quarl, all that is required is to slacken the nuts 105 and tilt the threaded rods 104 in such a way that they are released from engagement in the recesses in the flange 32.

When, with the burner fastened into the quarl, the oxidizer inlet 6 communicates with an oxidizer supply, all that is required is to rotate the key 9 of the valve so as to modify the distribution of the oxidizer between the central oxidizer feed tube 1 and the outer oxidizer feed tube 3 and to adjust this distribution in the desired manner. More specifically, the calibrated hole 81 in the interchangeable plug 8 defines the minimum flow rate in the outer oxidizer feed tube 3 when the control valve is closed (hole 91 in the key 9 approximately orthogonal to the central longitudinal axis of the burner) and the maximum flow rate is then obtained in the central oxidizer feed tube 1. As the valve is gradually opened, that is to say as the hole 91 in the key 9 is brought into alignment with the channel 73 of the bush 7, the pressure drop decreasing in the outer tube 3, the flow rate increases in the latter until reaching the maximum value, and decreases in the central tube 1 until reaching the minimum value. Managing the pressure drop in the outer tube 3 therefore makes it possible to adjust the distribution of oxidizer between the two oxidizer feed tubes 1, 3.

Thus, there is the possibility of continuously adjusting the distribution of the oxidizer between the tubes 1, 3 mounted in parallel with respect to one another and, in particular when the valve is motor-driven, it is possible to act on the latter at any moment in order to regulate the distribution or to control it according to the requirements.

The interchangeability of the plug 8 makes it possible to widen the range of oxidizer flow rates by having a range of plugs 8 with holes 81 of different cross sections.

What is claimed is:

1. A three-tube burner for a furnace, designed to be fastened to a furnace quarl in such a way that at least one end region of the burner is housed in the quarl in order to produce therein a flame projecting into the internal space of the furnace, said burner comprising:
    an inlet for a fuel and a fuel feed tube connected to this fuel inlet,
    an inlet for an oxidizer and two oxidizer feed tubes connected to this oxidizer inlet, and
    a control valve housed in the burner for controlling the distribution of the oxidizer between the two oxidizer feed tubes.

2. The burner according to claim 1, wherein one oxidizer feed tube and the fuel feed tube are housed in another oxidizer feed tube.

3. The burner according to claim 1, wherein the feed tubes are arranged coaxially around one another, at least over part of their length.

4. The burner according to claim 1, wherein the control valve is housed in the burner, by being inserted into an oxidizer feed tube.

5. The burner according to claim 1, wherein the control valve is a plug valve.

6. The burner according to claim 1, wherein one of the two oxidizer feed tubes has an oxidizer inlet end open inside another oxidizer feed tube.

7. The burner according to claim 1, wherein the two oxidizer feed tubes include a central oxidizer feed tube and an outer oxidizer feed tube, the fuel feed tube defining an annular space for flow of fuel around the central tube, the outer oxidizer feed tube defining an annular space for flow of oxidizer around the fuel feed tube, and an annular bush inserted into the annular space for flow of oxidizer between the fuel feed tube and the outer oxidizer feed tube, downstream of an open end of the central tube in the outer tube and also downstream of the inlet for the oxidizer, this bush having a channel allowing the oxidizer to flow towards the quarl and a movable member cooperating with the channel to form a control valve.

8. The burner according to claim 7, wherein the bush has a channel in which a plug is housed, said plug having a calibrated hole allowing the oxidizer to flow towards the quarl with a predetermined minimum flow rate.

9. The burner according to claim 7, wherein the bush has a channel forming a plug valve in which a pivoting valve key is housed, said key having a through-hole and able to move from a position in which the through-hole allows the oxidizer to flow with the maximum flow rate through the valve and thus with the minimum flow rate through the central tube to a position in which the through-hole prevents any flow of oxidizer through the valve and thus causes flow with the maximum flow rate through the central tube.

10. The burner according to claim 1, wherein the valve includes an operating member allowing it to pivot manually.

11. The burner according to claim 1, wherein the valve includes a driving member designed to be connected to a motor-drive device.

12. The burner according to claim 2, wherein the feed tubes are arranged coaxially around one another, at least over part of their length.

13. The burner according to claim 2, wherein the control valve is housed in the burner, by being inserted into an oxidizer feed tube.

14. The burner according to claim 3, wherein the control valve is housed in the burner, by being inserted into an oxidizer feed tube.

15. The burner according to claim 2, wherein the control valve is a plug valve.

16. The burner according to claim 3, wherein the control valve is a plug valve.

17. The burner according to claim 2, wherein one of the two oxidizer feed tubes has an oxidizer inlet end open inside another oxidizer feed tube.

18. The burner according to claim 3, wherein one of the two oxidizer feed tubes has an oxidizer inlet end open inside another oxidizer feed tube.

19. The burner according to claim 2, wherein the two oxidizer feed tubes include a central oxidizer feed tube and an outer oxidizer feed tube, the fuel feed tube defining an annular space for flow of fuel around the central tube, the outer oxidizer feed tube defining an annular space for flow of oxidizer around the fuel feed tube, and an annular bush inserted into the annular space for flow of oxidizer between the fuel feed tube and the outer oxidizer feed tube, downstream of an open end of the central tube in the outer tube and also downstream of the inlet duct for the oxidizer, this bush having a channel allowing the oxidizer to flow towards the quarl and a movable member cooperating with the channel to form a control valve.

20. The burner according to claim 3, wherein the two oxidizer feed tubes include a central oxidizer feed tube and an outer oxidizer feed tube, the fuel feed tube defining an annular space for flow of fuel around the central tube, the outer oxidizer feed tube defining an annular space for flow of oxidizer around the fuel feed tube, and an annular bush inserted into the annular space for flow of oxidizer between the fuel feed tube and the outer oxidizer feed tube, downstream of an open end of the central tube in the outer tube and also downstream of the inlet duct for the oxidizer, this bush having a channel allowing the oxidizer to flow towards the quarl and a movable member cooperating with the channel to form a control valve.

21. The burner according to claim 19, wherein the bush has a channel in which a plug is housed, said plug having a calibrated hole allowing the oxidizer to flow towards the quarl with a predetermined minimum flow rate.

22. The burner according to claim 8, wherein the bush has a channel forming a plug valve in which a pivoting valve key is housed, said key having a through-hole and able to move from a position in which the through-hole allows the oxidizer to flow with the maximum flow rate through the valve and thus with the minimum flow rate through the central tube to a position in which the through-hole prevents any flow of oxidizer through the valve and thus causes flow with the maximum flow rate through the central tube.

23. The burner according to claim 2, wherein the valve includes an operating member allowing it to pivot manually.

24. The burner according to claim 3, wherein the valve includes an operating member allowing it to pivot manually.

25. The burner according to claim 2, wherein the valve includes a driving member designed to be connected to a motor-drive device.

26. The burner according to claim 3, wherein the valve includes a driving member designed to be connected to a motor-drive device.

27. The burner according to claim 1, wherein the valve is located in a space concentrically surrounding one of the oxidizer feed tubes.

28. A method of injecting fuel and oxidizer into a furnace quarl by means of a burner for producing a flame projecting into the internal space of the furnace, the method comprising:

introducing an oxidizer into the burner via a first inlet and introducing a fuel via a second inlet, flowing the oxidizer coming from the first inlet towards the quarl through at least two oxidizer feed tubes mounted in parallel one with respect to the other, and flowing the fuel coming from the second inlet towards the quarl through a fuel feed tube.

29. The method according to claim 28, wherein a distribution of the oxidizer between the oxidizer feed tubes is continuously adjusted.

30. The method according to claim 28, wherein a distribution of the oxidizer between the oxidizer feed tubes is adjusted manually.

31. The method according to claim 28, wherein a distribution of the oxidizer between the oxidizer feed tubes is adjusted in a motor-driven manner.

32. The method according to claim 31, wherein the distribution of the oxidizer between the oxidizer feed tubes is regulated or controlled.

33. The method according to claim 28, wherein the fuel flows towards and is injected into the quarl in an annular manner around a first, central, stream of oxidizer and within a second, annular, stream of the same oxidizer.

34. The method according to claim 29, wherein the distribution of the oxidizer between the oxidizer feed tubes is adjusted manually.

35. The method according to claim 29, wherein the distribution of the oxidizer between the oxidizer feed tubes is adjusted in a motor-driven manner.

36. The method according to claim 29, wherein the fuel flows towards and is injected into the quarl in an annular manner around a first, central, stream of oxidizer and within a second, annular, stream of the same oxidizer.

37. The method according to claim 36, wherein the control valve is located in a space concentrically surrounding one of the oxidizer feed tubes.

* * * * *